3,679,653
HORMONALLY-ACTIVE REACTION PRODUCT OF
A POLYMER WITH A HORMONE
James M. Schuck, Chesterfield, and Bernard S. Wildi,
Kirkwood, Mo., assignors to Monsanto Company, St.
Louis, Mo.
No Drawing. Filed Sept. 27, 1968, Ser. No. 763,364
Int. Cl. A61k 17/00; C07c 103/52; C08f 27/08
U.S. Cl. 260—112.5                                    9 Claims

ABSTRACT OF THE DISCLOSURE

A hormonally-active reaction product of a peptidic hormone such as bovine growth hormone, insulin, vasopressin, adrenocorticotropic hormone, and the like, with a copolymer of an olefinically unsaturated polycarboxylic acid and an olefin. The hormone is covalently bound to the polymer through an amino, hydroxyl, or sulfhydryl group of the hormone which is not essential for hormonal activity. These products have improved stability, are substantially odorless and colorless, and have prolonged activity when contrasted with the native hormone.

BACKGROUND OF INVENTION

(1) Field of invention

Polymer peptidic or proteinaceous hormone products.

(2) Prior art

It is well known that native peptidic or proteinaceous hormones have finite and relatively short half-lives while circulating through animal or plant systems. One of the causes of this limited life-span is the continuous digestive action of serum proteases such as trypsin on these labile substances. In addition, native hormones may become inactivated both endogenously and exogenously by heat, pH of solution, and/or other well-documented phenomena.

Since a hormone by definition is a substance which is prepared in one location, either inside the system to which administered or in another system, and which is subsequently transported to the respective target organ or tissue, then transport itself and affinity towards a receptive tissue is a vital factor in the manifestation of the desired biological action. Anything which interferes with transport or affinity detracts from the effectiveness of the hormonally active product upon administration.

It is also well known that most proteins are primarily composed of repetitions of 20 to 24 individual amino acids arranged in a specific manner with regard to a linear sequence (primary sequence). The linear molecule then may fold over itself to give a three-dimensional structure (tertiary structure) such that the juxtaposition of otherwise remote amino acid residues can bring about desirable interactions, thereby resulting in "native" protein. The interaction of amino acid residues may be covalent (e.g., disulfide bridges with cystine); ionic (e.g., interaction of $RCOO^-$ and $RNH_3^+$), or non-polar (Van der Waal attractions of hydrophobic regions). The disruption of these interactive bonds is known as denaturation. Whenever this occurs, whether before or during administration, or during transport within the system, or otherwise after administration, the particular hormonal activity of that portion of the product so affected comes to an end. It would be highly desirable to have available the valuable peptidic and proteinaceous hormones in a form which was not so readily denaturable or inactivated, whether endogenously or exogenously.

SUMMARY OF THE INVENTION

The present invention provides novel products in which a peptidic or proteinaceous hormone is covalently bonded to a selected polymer and a process for their production. These novel polymer-hormone products have valuable and unpredictable properties.

Unexpectedly it has been found that polymer-hormone products can be prepared which not only retain biological activity but which, in addition, have increased stability relative to the native hormone. This increased stability may be the result of several possible factors such as a "locking in" of a vital configuration due to poly-dentate covalent bonds, a selective blockage of otherwise hydrolytically unstable amino acid residues, an envelopment of the hormone with an ionically repulsive halo preventing approach by charged proteases, or other factors which cannot be readily explained at this time. The water-insoluble polymer-hormone products provide a low but continuous release of activity for implanted systems.

OBJECTS

The provision of novel peptidic and proteinaceous hormone-polymer products having any or all of the foregoing advantages or advantageous properties or characteristics, and a process for the production of such products, is one of the objects of the present invention. Other objects will become apparent hereinafter and still others will be obvious to one skilled in the art.

GENERAL DESCRIPTION OF THE INVENTION

Definitions

"EMA" is a polymer of ethylene and maleic anhydride. Polymers of this type are of great value according to the present invention.

"EMA type" polymer is defined hereinafter.

"EMA-hormone" or "EMA/hormone" is a copolymer of ethylene and maleic anhydride having the proteinaceous or peptidic hormone covalently bonded thereto. The product is the same whether the hormone is reacted directly with an an hydride group of the ethylene-maleic anhydride copolymer or with a carboxyl group of the ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such non-participating groups may, however, be converted to amide, imide, ester, et cetera, groups, as can be present in EMA-type polymers, as hereinafter defined.

"Water-insoluble" means that the product concerned does not dissolve in water or aqueous solutions, although it may have such characteristics as a high degree of swelling due to water solvation, even to the extent of existence in gel form. "Water-soluble" means not water-insoluble, and is further defined hereinafter.

The products of the invention are hormonally-active polymer-hormone products wherein the hormone is bound covalently through a group which is non-essential for its hormone activity to a polymer of the type more fully disclosed hereinafter, but preferably a polymer (a) comprising chains of repeating carboxylic acid or carboxylic acid anhydride units, or (b) comprising units of carboxylic acid or carboxylic acid anhydride groups separated by carbon chains of at least one and not more than four carbon atoms, said carbon chains being part of a unit which contains a maximum of eighteen carbon atoms, said polymer being formed by polymerization of polymerizable acids or anhydrides or by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

Process

Polymer-hormone derivatives can be prepared by reacting the crystalline or crude hormone or mixture of hormones with the polymer in solution, resulting in formation of a polymeric product in which the hormone is covalently bound. Since an anhydride or carboxyl is present in the polymer, e.g., an EMA-type polymer, covalent bonding of the hormone to the polymer may be effected directly through reaction or coupling with an anhydride group or with a carboxyl group using a carboxyl activating agent. The product is the same in both cases. The pH range for the reaction depends upon the hormone employed and its stability range. It is usually about 5 to 9.5, preferably about 6 to 8, but adjustment must be made for individual cases. Isolation and purification is generally effected according to normal biochemical procedures, and by the general procedure of the examples which follow. Since covalent bonding of the hormone to the polymer is desired, the reaction is ordinarily carried out at low temperatures and at relatively neutral pH's, in water or dilute aqueous buffer as solvent.

When carried out in this manner, the results are production of the desired active polymer-hormone derivative, but degree of activity imparted to the polymeric product is sometimes lower than desired, possibly due to partial inactivation of the hormone during the process. Resort may frequently advantageously be had to employment of a mixed solvent system, using a solvent in which the hormone is at least partially soluble, usually in an amount up to about 50% by volume. Dimethylsulfoxide (DMSO) is especially suitable as solvent together with water or aqueous buffer solution in a mixed solvent system. Using such a mixed solvent system, the desired active hormone polymer product is ordinarily obtained in higher yields and conversions to desirably active product, and introduction of desirably high amounts of hormone activity into the polymer molecule is generally less difficult.

As far as the polymer in such reaction, it preferably contains carboxyl or anhydride linkages, especially where the hormone contains an amino, hydroxyl (including phenolic hydroxyl), or sulfhydryl group not essential for its activity. Where the hormone contains a carboxyl group not essential for activity, the polymer can contain free hydroxyl or amine groups for reaction therewith. The polymer is preferably EMA or an EMA-type polymer, but it can be any of those types disclosed for coupling or reaction with a hormone, and in any event it is adapted to effect covalent bonding with the hormone to produce a hormone-polymer product either directly or indirectly using an activating agent. Inasmuch as the hormonal activity of the starting hormone is desired to be retained in the final product, it is, of course, firstly necessary that bonding of the hormone to the polymer be through a group which will not result in inactivation of an active site in the hormone molecule. Among the various reactive groups of hormone molecules may be mentioned, besides amino and sulfhydryl, also hydroxyl (including phenolic hydroxyl), carboxyl and imidazolyl. Such groups are present in free or unbound form in inactive portions of hormone molecules, as in a lysine, cysteine, serine, aspartic acid, glutamic acid, threonine, histidine, or tyrosine moiety of a hormone molecule, where the particular moiety in question is not considered essential for hormonal activity. Therefore, attachment to the polymer molecule is through reaction of the polymer with such groups so as to avoid inactivation of the hormone during attachment to the polymer molecule. Generally, the linkage is an amide, imide, ester, thioester, or disulfide group, such as formed by the carboxyl or anhydride of the polymer with an amine or hydroxyl group in a non-essential moiety of the hormone protein chain. Amides are formed by reacting pendant amino groups of the hormone with carboxylic anhydride groups on the carrier polymer in water, in aqueous buffer media, or in mixed solvents. Amides, imides and esters are readily formed by activating carboxyl groups of the polymer, or alternatively pendant carboxyls of the hormone, and reacting them with respective hydroxyl, amine or mercaptan groups on the other reactant. Such activation may be effected using various carbodiimides, carbodiimidazoles, Woodward's or Sheehan's reagent, or the like, to form highly active intermediates capable of reacting with other groups mentioned above under mild conditions, the latter favoring retention of hormonal activity.

The polymer selected for such reaction can therefore be said to be adapted to couple or react with the hormone, either directly or indirectly through use of an activating agent, as already indicated, and in any event to effect covalent bonding with the hormone. The attachment procedures given are conducted by techniques adapted to include any requisite protection for the hormone, which may include a reversible blocking of hormonally active site or sites.

General procedure for solubles preparation

In order to achieve high yields of aqueously-soluble hormone-polymer products, it is desirable to avoid crosslinking, which results in insolubilization.

To prepare water-soluble hormone-polymer derivatives, therefore, the reaction is preferably performed under substantially non-crosslinking conditions. The undesired crosslinking can be reduced by performing the attachment reaction in high dilution such that fewer reactions occur between several polymer molecules and a single hormone molecule. Alternatively, high ratios of hormone to polymer favor reactions of several hormone molecules with a single polymer molecule. This, therefore, results in an agglomerated hormone/polymer system, which maintains the desired soluble properties of the individual hormone molecules. An additional way of favoring soluble formation is to run the reaction at high or moderate ionic strength to decrease aggregation of the native protein. While such procedures as described above are often desirable, it is not always necessary to use dilute solutions or high hormone/polymer ratios to cause formation of soluble hormone/polymer derivatives.

The term "water-soluble" means that the product concerned dissolves in water or aqueous solutions. As usual, however, this does not mean that the product dissolves completely at all concentrations or at all pH's. On the other hand, these water-soluble products are characterized by being soluble at a variety of concentrations and pH's, and they are generally soluble at a pH of 7 or greater.

In their soluble form the polymer-hormone products of the invention are characterized by fundamentally the same hormone action as the parent native hormone, but have all of the advantages which are attendant upon applicability in solution or suspension from together with increased stability and prolonged activity. In addition, because of their polymeric form, even though soluble, the polymer-hormone products of the invention are separable from native hormone, as well as impurities and coloring matter of an undesired nature, by normal separation procedures such as centrifugation, electrophoresis, or chromatography.

Polymeric reactant-crosslinking-water-insolubility/solubility

In its broadest context, the polymer to which the hormone is coupled according to one or more aspects of the invention contains carboxyl or anhydride linkages, especially where the hormone contains an amino, hydroxyl, or sulfhydryl group not essential for its hormonal activity. Where a hormone contains a carboxyl group not essential for activity, the polymer can contain hydroxyl or amine groups for reaction herewith. The polymer may be EMA or an EMA-type polymer, or be any of those types previously disclosed for coupling or reaction with a hormone, and in any event it is adapted to couple or react with the hormone to effect covalent bonding and production of the desired hormone-polymer product.

Since covalent bonding is desired, it is understood that the carrier polymer is tailored to contain at least one reactive site for each polymer molecule with which the hormone can react, either directly or indirectly, to produce a covalent bond. According to the instant invention, this reactive site (or sites) is preferably a carboxyl or carboxylic anhydride group.

The polymeric reactant is preferably a polymer (a) comprising chains of carboxylic acid or carboxylic acid anhydride units, or (b) comprising units of carboxylic acid or carboxylic acid anhydride groups separated by carbon chains of at least one and not more than four carbon atoms, said carbon chains being part of a unit which contains a maximum of eighteen carbon atoms, said polymers being formed by polymerization of polymerizable acids or anhydrides or by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

Among the polymers suitable for the practice of the instant invention, polymeric polyelectrolytes having units of the formula $$\left[ \begin{array}{c} -Z-CR_A-(CH_2)_q-CR_B- \\ | \quad\quad\quad\quad\quad\quad | \\ O=C \quad\quad\quad\quad\quad C=O \\ | \quad\quad\quad\quad\quad\quad | \\ X \quad\quad\quad\quad\quad\quad Y \end{array} \right]_n$$

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of 1 to 18 carbon atoms, inclusive, and preferably comprising a bivalent carbon chain having 1 to 4 carbon atoms, inclusive, said carbon chain being a part of a unit which contains 1 to 18 carbon atoms, inclusive, q is zero or one, X and Y are selected from hydroxy, —O alkali metal, OR,

—OH—NH$_3$

—OH—R$_3$N, —OH—R$_2$NH, —OH—RNH$_2$, —NRR',

—(Q)$_p$—W—(NR'R')$_x$ and —(Q)$_p$—W—(—OH)$_x$, wherein $x$ is 1 to 4 and $p$ is zero or one, wherein R is selected from the group consisting of alkyl, phenylalkyl, or phenyl, in each case of 1 to 18 carbon atoms, wherein R' is H or R, wherein Q is oxygen or —NR'—, and wherein W is a bivalent radical preferably selected from lower-alkylene, phenyl, phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the hormone attachment reaction, or produced as a minor modification of the basic polymer after attachment. Such polymers containing the above-described EMA-type units are hereinafter referred to as an "EMA-type polymer."

Since hormone molecules may have a high molecular weight, even if the polymeric units exemplified as usable for attachment of the hormone occurs only once in a polymer chain, for example, once in every several hundred units, reaction of the hormone with this unit will result in a hormone-polymer product having substantial hormonal activity and one wherein the hormone moiety constitutes a substantial portion of the molecular weight of the polymer-hormone product. As pointed out hereinafter, preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or —N—W—(NR'R')$_x$ wherein R, W and R' have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the non-vicinal type, including acrylic acid, acrylic anhydride, methacrylic acid, crotonic acid or their respective derivatives, including partial salts, amides and esters or of the vicinal type, including maleic, itaconic, citraconic, α,α-dimethyl maleic, α-butyl maleic, α-phenyl maleic, fumaric, aconitic, α-chloromaleic, α-bromomaleic, α-cyanomaleic acids including their partial salts, amides and esters. Anhydrides of any of the foregoing acids are advantageously employed.

Co-monomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl amine, vinyl chloride, vinyl formate, vinyl propionate, vinyl alkyl ethers, e.g., methylvinylether, alkyl acrylate, alkyl methacrylates, acrylamides and alkylacrylamides, or mixtures of these monomers. Reactivity of some functional groups in the copolymers resulting from some of these monomers permits formation of other useful functional groups in the formed copolymer including hydroxy, lactone, amine and lactam groups.

Any of the said polybasic acid derivatives may be copolymerized with any of the other monomers described above, and any other monomer which forms a copolymer with dibasic acid derivatives. As an additional modification, the polybasic acid derivatives can be copolymers with a plurality of comonomers, in which case the total amount of the comonomers will preferably be about equimolar with respect to the polybasic acid derivatives. Although these copolymers can be prepared by direct polymerization of the various monomers, frequently they are more easily prepared by an after-reaction modification of an existing copolymer.

Copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia, either prior to, during, or subsequent to hormone attachment, etc. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl, which are prepared in the same manner in each case with due consideration of preservation of hormone attachment sites as previously stated. Other aryl groups may be present in place of phenyl groups. Particularly useful derivatives are those in which negatively-charged carboxyl groups are partially replaced with amine or amine salt groups. These are formed by reaction of said carboxyls with polyamines such as dimethylaminopropylamine or dialkylaminoalcohols such as dimethylaminoethanol, the former forming an amide linkage with the polymer and the latter an ester linkage. Suitable selection of the above derivatives permits control of several parameters of performance for the hormone-polymer products of the invention.

Representative dibasic acid or anhydride-olefin polymers, especialy maleic acid or anhydride-olefin polymers, of the foregoing type (EMA-type) are known, for example, from U.S. Pats. 2,378,629, 2,396,785, 3,157,595 and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that the attachment or coupling reactions of the present invention are carried out in aqueous solutions or suspensions, or using water-solvent mixtures, the product of the covalent bonding of the hormone to EMA has carboxyl or carboxylate groups attached to its chains adjacent the attached hormone instead of anhydride groups, due to hydrolysis of the anhydride groups, which do not react with the hormone, during the reaction. The same is true of nonreacting anhydride groups present in other polymers, such as EMA-type polymers, which hydrolyze to carboxyl or carboxylate groups during the reaction.

The term "water-insoluble," as already stated, when applied means that the product concerned does not dissolve in water or aqueous solutions, even though it may have such characteristics as a high degree of swelling due to solvation by water, even to the extent of existence in a gel form. "Water-insoluble" products can be separated by methods including filtration, centrifugation or sedimentation. Such characteristics are imparted by crosslinking.

In their insoluble form, the polymer-hormone products are characterized by the same general hormone action as the parent hormone, but have all of the advantages which are attendant upon applicability in insoluble form together with increased stability and prolonged activity, apparently due to slow release from a site of implanation. In addition, because of their polymeric form, the polymer-hormone products of the invention are readily separable as indicated previously.

Thus, water-insoluble polymer-hormone products are produced by reacting the hormone with a water-insoluble polymer or by causing the reaction product of the hormone and polymer to become insoluble either by reaction with a polyfunctional crosslinking agent, such as a polyamine or polyol (including glycol), when this is necessary. The hormone-polymer product is frequenty at least in part insoluble per se because of interaction between the hormone moiety and additional polymer chains. If the polymer is pre-crosslinked so as to have a three-dimensional structure or, in some cases, has a sufficiently long linear chain length, the starting polymer is already water-insoluble. Other methods of crosslinking exist and are well known in the art. Further detailed description follows.

Insolubilization via crosslinking can be introduced at any of three stages in the preparation of the polymer-hormone products of this invention:

(1) The carrier polymer may be crosslinked prior to attachment by any of several procedures well known in the art of polymer reactions (e.g., incorporation of multifunctional unsaturated monomers during preparation of the polymer or subsequent reaction of the polymer with a few mole percent of multifunctional amines, glycols, etc.).

(2) Multifunctional amines, glycols, etc. can be added concurrently in the attachment or coupling step.

(3) A multifunctional crosslinking agent may be added to the product after attachment. Such crosslinking agents are added in controllable amounts sufficient to insolubilize the product.

In addition, the hormone to be attached or coupled to the polymer is commonly multifunctional in itself and thus contributes to the three-dimensional network character of the product. In many cases, the insolubilization effected in this manner alone is sufficient to impart insoluble characteristics to the product without use of additional crosslinking agents.

When markedly insoluble products are the objective, it is often advantageous to employ copolymers which already contains some crosslinking. Such crosslinked copolymers are known and are obtainable by conducting the polymerization, e.g., the copolymerization of maleic anhydride and hydrocarbon olefin, in the presence of a crosslinking agent, e.g., a compound containing two olefinic double bonds, such as divinylbenzene or vinylcrotonate, poly-1,2-butadiene or alpha, omega-diolefins. The quantity of crosslinking agent will vary with the degree of insolubility desired, but generally will be on the order of from 0.1% to 10% by weight of the total monomer mixture.

As one example of procedure for preparation of the three-dimension polymer network, where necessary or desirable, a difunctional compound can be used for crosslinking a preformed dibasic acid/$C_2$–$C_{18}$ monoolefin copolymer. This can be achieved by reaction between the copolymer and a polyamine, e.g., from 0.1 to 10 mole percent of ethylenediamine. Thus, the quantity of crosslinking of the overall polymer can be controlled. It is understood that ethylenediamine is a typical example of a crosslinking reagent, but many other compounds, such as the group of alkylene and other similar polyamines, can be used for this purpose. Soluble hormone-polymer products, on the other hand, can advantageously be produced by somewhat different operating procedure, as already indicated.

Preferred polymers are selected from the group consisting of ethylene/maleic anhydride copolymer,
styrene/maleic anhydride copolymer,
vinyl methyl ether/maleic anhydride copolymer,
vinylacetate/maleic anhydride copolymer,
divinyl-ether/maleic anhydride cyclocopolymer, polymaleic anhydride and polyacrylic anhydride, and cationic derivatives thereof, and preferred hormones are listed hereinafter.

Hormones

The peptidic or proteinaceous hormone starting material may be obtained from any suitable source. At any rate, whatever hormone or hormone mixture is employed as starting material according to the invention, it or they will be covalently bound into the polymer-hormone molecule.

Many hormones are known and are suitable for incorporation into the polymer-hormone products of the invention. Numerous starting hormones are available commercially.

The exact activity of the hormone or hormones employed as starting material in the invention is not critical, providing only that the starting hormone has the desired activity suitable for the ultimately intended use of the product. Various analytical methods are available to determine the activity of hormones and hormonally active materials.

DESCRIPTION OF THE PREFERRED EMBODIMENTS

The following examples are given by way of illustration only, and are not to be construed as limited.

EXPERIMENTAL

The general procedures employed consisted of allowing cold solutions of hormones in appropriate buffers to react overnight at 4° C. with cold, homogenized polymer, e.g., EMA, suspensions. EMA–21 was preferably employed, which had a molecular weight of ca. 20–30,000. Other molecular weight polymers may also be used. For example, EMA–11, having a molecular weight of about 2–3,000, and EMA–31, having a molecular weight of about 60,000, may also be employed. In some cases a crosslinking agent was employed to affect molecular size. Hexamethylenediamine is a preferred crosslinker. Separation of soluble and insoluble products, after reaction, was achieved by centrifugation in the cold [Sorval SS–3 (TM) centrifuge, ca. 10,000 r.p.m. and 10 min. centrifugation time]. The soluble products were generally exhaustively dialyzed against water in the cold and then lyophilized. Insoluble products were washed (and centrifuged), usually ten times with cold buffer and five times with cold distilled water and then lyophilized.

The reaction of the polymer with a plurality of hormones, if desired, can obviously be carried out stepwise, one hormone at a time, with or without intermediate isolation, or with all hormones at once. The latter procedure is preferred for reasons of time, convenience, and economy.

EXAMPLE 1

Adduct of ethylene maleic anhydride—bovine growth hormone (BGH)

(a) A suspension of 1.0 g. of EMA (EMA–21) in 100 ml. of cold (4° C.) 0.2 M phosphate buffer pH 7.5 was homogenized for one minute in a cold Waring Blendor. To a 10 ml. portion was added a solution of 1 ml. of 1% hexamethylenediamine in 5 ml. of phosphate buffer pH 7.5. After stirring for three minutes, a solution of 40 mg. of bovine growth hormone, prepared by the procedure of S. Ellis, Endocrinology, 69, 554 (1960), in 20 ml. distilled water (brought to pH 9.5 with KOH) was added. The mixture was adjusted to pH 7.5 and stirred for 18 hours at 3° C. The precipitate was washed 3 times with distilled water and then alternately with 0.1 M NaCl and distilled water. The solid was dialyzed against 4 changes of 12 liters of distilled water over a 24 hour period and lyophilized to give 101.2 mg. of insoluble product.

The supernatants from the above washes were combined and lyophilized, dialyzed against 4 changes of 12 liters of distilled water and lyophilized to give 125.5 mg. of soluble product. The soluble product had significant activity. A 40 mg. per day dose of the BGH–EMA soluble product was essentially equivalent to 5 mg. per day of BGH when tested by the Δ weight assay (body weight change of hypohysectomized rats following injection of test material) of W. Marx, M. Simpson and H. Evans (Endocrinology, 30, 1 (1942)). The EMA–BGH product is much more stable than the parent hormone, as shown by stability tests over a 2–4 month period.

Analysis of the above soluble EMA–BGH adduct by disc acrylamide electrophoresis, using a physical mixture of BGH plus hydrolyzed ethylene maleic acid as a control, indicated that there was no detectable free BGH in the EMA–BGH adduct. This adduct did not migrate into the gel media whereas the BGH in the associated control migrated into the gel in the usual manner.

(b) EMA–21/BGH soluble and insoluble products: EMA–21 (171.6 mg.) was homogenized for 1 min. in 50 ml. cold 0.2 M phosphate buffer, pH 7.5, and this mixture was combined with 206.1 mg. BGH dissolved in 25 ml. 0.2 M phosphate buffer, pH 7.5. The mixture was then stirred in the cold (4° C.). The insoluble BGH/EMA product was isolated from the supernatant by centrifugation and then washed twenty times with 0.1 M NaCl followed by dialysis and lyophilization to yield 105.9 mg. product (4.50% N, dry weight).

Dialysis and lyophilization of the supernatant gave 250.8 mg. soluble BGH/EMA product.

Assay: (Greenspan et al., Endocrinology, 45, 455 (1950)):

|  | Injected dose | Tibia width (microns) |
| --- | --- | --- |
| Insoluble BGH/EMA product | 1,600 | 10.1 x 20 |
| Soluble BGH/EMA product | 267 | 14.6 x 20 |
| BGH | 100 | 16.0 x 20 |
| Saline |  | 7.6 x 20 |

(c) EMA–31/BGH soluble and insoluble products: Following the same procedure as in (b) and using 287.9 mg. BGH and 151.4 mg. EMA–31, there was obtained 117.3 mg. insoluble BGH/EMA product (3.65% N, dry weight) and 300.5 mg. soluble BGH/EMA product (8.90% N, dry weight).

Assay: (Greenspan et al., Endocrinolgy, 45, 455 (1950)):

|  | Injected dose | Tibia width (microns) |
| --- | --- | --- |
| Insoluble BGH/EMA product | 438 | 10.88 x 20 |
| Soluble BGH/EMA product | 180 | 12.36 x 20 |
| BGH | 100 | 15.54 x 20 |
| Saline |  | 7.6 x 20 |

EXAMPLE 2

Adduct of EMA–BGH (without crosslinking agent)

To 0.15 g. of BGH dissolved in 30 ml. of cold 0.2 M phosphate buffer pH 7.5 was added a homogenized (1 min.) suspension of 0.21 g. of EMA (EMA–21) in 50 ml. of 0.2 M phosphate buffer pH 7.5. The mixture was stirred overnight at 4° C. After centrifugation to remove the insoluble material, the supernatant was lyophilized to give 0.24 g. of soluble EMA-BGH. Assay using the tibia method of F. Greenspan, C Li, M. Simpson and H. Evans, Endocrinology, 45, 455 (1949), indicated that 215 mg./day of adduct was essentially equivalent to 100 mg./day of BGH. Disc acrylamide gel analysis of the adduct showed no native BGH entering the gel. Elemental analysis of the adduct indicated that the lyophilized soluble EMA-BGH product contained 5.33% N and 14.86% water.

The EMA–BGH product has the activity of the parent hormone but is much more stable.

EXAMPLE 3
Insulin-EMA

To 0.10 g. of insulin in 30 ml. cold 0.2 M phosphate buffer pH 7.5 was added 0.13 g. of EMA-31 (MW ca. 60,000) homogenized (1 min.) in 50 ml. of 0.2 M phosphate buffer. The mixture was stirred overnight at 4° C. and then centrifuged. Lyophilization of supernatant gave 0.24 g. of product. The disc acrylamide electrophoresis of the adduct differed from that obtained with native insulin. Assay for reduction of plasma glucose upon injection II of test material into rabbits and chickens, according to standard procedure (Dorfman, "Methods in Hormone Research," vol. II, p. 413, Academic Press, 1962), based on equivalent nitrogen value, indicated that the soluble EMA-insulin lowered blood sugar significantly although not as well as native insulin. The percent change after one hour was a reduction to 76% of initial value for adduct as opposed to 54% of initial with $0.5\mu$ of native insulin. The EMA-insulin product is much more stable than the parent hormone.

In another test, both insoluble and soluble insulin-EMA-31 products were used. After one hour, the percent reduction was about the same, the percent reduction for insulin being 51%, for insoluble product 61%, and for soluble product 56%.

EXAMPLE 4
Vasopressin-EMA

To 12.55 mg. of vasopressin (Mann Research No. 5346; 1,000 IU) in 20 ml. of 0.2 M phosphate buffer pH 7.5 was added 48.3 mg. of EMA (MW 30,000) which had been homogenized 1 min. with 25 ml. of the above buffer. An additional 15 ml. of buffer was added and the suspension was stirred overnight at 4° C. The mixture was centrifuged and both the soluble and the insoluble portions were dialyzed and then lyophilized to give 9.2 mg. of soluble EMA-vasopressin and 19.4 mg. of insoluble EMA-vasopressin.

Both the soluble and insoluble forms of the EMA-vasopressin product have the activity of the parent hormone, but are much more stable.

EXAMPLE 5
ACTH-EMA

Same procedure as in Example 4; same solvent and volumes employed.

Reactants: 10 mg. ACTH (Mann Research ACTH peptide-porcine pituitary 150 $\mu$/mg.) 58.09 mg. EMA (30,000 MW).

Products: 47.69 mg. soluble ACTH-EMA and 29.38 mg. of insoluble ACTH-EMA.

Both the soluble and insoluble forms of the EMA-ACTH product have the activity of the parent hormone, but are much more stable.

EXAMPLE 6
ACTH-EMA (crosslinker added)

To 10 mg. of ACTH in 8 ml. of 0.2 M potassium phosphate buffer pH 7.5 was added 0.5 ml. of 1% hexamethylenediamine solution and 50 mg. of EMA (MW 30,000). The mixture was stirred overnight at 4° C. Centrifugation followed by dialysis and lyophilization gave 43 mg. of insoluble EMA-ACTH. The soluble adduct was also recovered by lyophilization.

Both the soluble and the insoluble forms of the ACTH-EMA product have the activity of the parent hormone, but are much more stable.

EXAMPLE 7
Purification of bovine growth hormone—(EMA-21) soluble fractions Sephadex (TM-crosslinked dextran) powders of G-100 (E.L. ca. 100,000), equilibrated with appropriate buffer solutions (2 M HOAc, pH 2, 0.2 M phosphate, pH 7.5 and glycine-NaOH, pH 9.5), were packed into columns. Preparative columns were ca. 1 m. x 3 cm. and analytical columns measured ca. 45 cm. x 1-2 cm. The hormone-EMA adduct (0.5-2.0 mg.) was placed on the analytical column using 0.1 ml. of 50% sucrose or buffer. Preparative column loadings were ca. 50-100 mg. of adduct in 1.0 ml. of 50% sucrose. Appropriate fractions were collected and elution was followed by measurement of optical density at either 215 m$\mu$ or 280 m$\mu$ or both when allowable. On G-100 columns, HEMA (hydrolyzed EMA)-21 was eluted in the void volume at pH 7.5 and 9.5 along with BGH-polymer product, while free BGH was eluted in a subsequent elution fraction (E-BGH).

The purified product did not migrate on disc gel electrophoresis, showing that the polymer-hormone product can be purified of unreacted hormone.

EXAMPLE 8
Resistance of BGH-EMA to tryptic digestion

Trysin cleaves proteins at arginine and at lysine bonds. Reaction of BGH with EMA forms amide linkages with the amino group of lysine thereby rendering them non-hydrolyzable with trypsin as shown by the following.

Tryptic digestion of BGH and BGH-EMA: To 52.23 mg. BGH in 4 ml. .1 M KCl pH 9.5 was added 5 ml. TPCK trypsin, prepared by the method of V. Kostka and F. Carpenter, J. Biol. Chem., 239, 1799 (1964), (0.47 mg./25 ml.) in 0.1 M KCl solution at pH 9.5. The solution was maintained at pH 9.5 with a Radiometer pH-stat. The rate of tryptic digestion of the BGH-EMA-21 product was followed by measuring the rate of appearance of free carboxyl groups, as determined by pH-stat using 0.01 M NaOH as titrant. The rate of hydrolysis was found to be significantly less for the BGH-EMA product than for an equivalent amount of BGH.

EXAMPLE 9
Other peptidic or proteinaceous hormone/EMA adducts

Other proteinaceous or peptidic hormones which form active stable EMA adducts in the manner of Examples 1 and 2 include the following:

Glucagon—(anti-insulinogenic—mobilizes glycogen, increases blood sugar)
Thyroxine—(amino acid hormone—affects basal metabolism)
Thyroid stimulating hormone (TSH)
Lactogenic hormone (prolactin)
Luteinizing hormone (LH)
Follicle-stimulating hormone (FSH)
Melanocyte stimulating hormone (MSH)
Oxytocin (stimulates milk ejection)
Secretin (affects digestive enzyme secretion)
Bradykinen (muscle contractor)
Angiotensin (pressor action hormone)
Lipotropic hormone (fat mobilizer).

EXAMPLE 10
Thyroxine-styrene/maleic anhydride copolymers

Coupling of thyroxine to an alternating styrene-maleic anhydride (1:1) copolymer, in aqueous buffer medium using the conventional procedure of Examples 1-2 at carrier to hormone ratios of 1:15 to 3:1, yields polymer-thyroxine derivatives having up to about 20% of the original hormonal activity.

EXAMPLE 11
Glucagon-vinyl methyl ether/maleic anhydride copolymers

Coupling of glucagon to an alternating vinyl methyl ether-maleic anhydride (1:1) copolymer, in aqueous buffer medium using the conventional procedure of Examples 1-2 at carrier to hormone ratios of 1:15 to 3:1, yields polymer-glucagon derivatives having up to about 50% of the original hormone activity.

EXAMPLE 12

TSH-vinyl acetate/maleic anhydride copolymers

Coupling of TSH to an alternating vinyl acetate-maleic anhydride (1:1) copolymer, in aqueous buffer medium using the conventional procedure of Examples 1–2 at carrier to hormone ratios of 1:15 to 3:1, yields polymer-TSH derivatives having up to about 35% of the original hormone activity.

EXAMPLE 13

Prolactin-divinyl ether/maleic anhydride cyclocopolymers

Coupling of prolactin with divinyl ether-maleic anhydride cyclopolymer (having repeating units consisting of adjacent ethylene-maleic anhydride segments which are additionally bonded to each other by an ether linkage), in aqueous buffer medium using the conventional procedure of Examples 1–2 at carrier to hormone ratios of 1:15 to 3:1, yields polymer-prolactin derivatives having up to about 50% of the original hormone activity.

EXAMPLE 14

LH-polymaleic anhydride polymers

Coupling of LH to a polymaleic anhydride polymer, in aqueous buffer medium using the conventional procedure of Examples 1–2 at carrier to hormone ratios of 1:15 to 3:1, yields polymer-LH derivatives having up to about 40% of the original hormone activity.

EXAMPLE 15

FSH-polymaleic anhydride polymers

Coupling of FSH to a polymaleic anhydride polymer, in aqueous buffer medium using the conventional procedure of Examples 1–2 at carrier to hormone ratios of 1:15 to 3:1, yields polymer-FSH derivatives having up to about 30% of the original hormone activity.

EXAMPLE 16

MSH-polymaleic anhydride polymers

Coupling of MSH to a polymaleic anhydride polymer, in aqueous buffer medium using the conventional proceduce of Examples 1–2 at carrier to hormone ratios of 1:15 to 3:1, yields polymer-MSH derivatives having up to about 20% of the original hormone activity.

EXAMPLE 17

Oxytocin-polyacrylic anhydride polymers

Coupling of oxytocin to a polyacrylic anhydride polymer, in aqueous buffer medium using the conventional procedure of Examples 1–2 at carrier to hormone ratios of 1:15 to 3:1, yields polymer-oxytocin derivatives having up to about 50% of the original hormone activity.

In the same manner, the identical hormone-polymer product is produced from polyacrylic acid, using Woodward's reagent, N-ethyl-5-phenyl isooxazolium-3'-sulfonate, as activator for the carboxyl groups of the polyacrylic acid.

EXAMPLE 18

Other hormone-EMA polymers

In the same manner as given in Examples 1–2, secretin, bradykinen, angiotensin, and lipotropic hormone are reacted with EMA-21 to provide stable active products respectively having about 28%, 30%, 32% and 30% of the activity of the native hormone.

EXAMPLE 19

Purified insulin-EMA polymer

Insulin-EMA products were prepared by allowing 106.11 mg. insulin in 15 ml. cold 0.2 M phosphate buffer, pH 7.5 to stir overnight at 4° C. with a mixture of EMA-21 (307.3 mg.) which had been homogenized for one minute with 30 ml. of cold phosphate buffer, and which was transferred with an additional 15 ml. of cold phosphate buffer. The insoluble materials were separated from the supernatant by centrifugation and washed with 0.1 M NaCl and water and finally lyophilized to yield the active insoluble insulin-EMA product. Dialysis and lyophilization of the supernatant yielded the soluble insulin-EMA product.

55.89 mg. insulin-EMA was dissolved in 0.4 ml. 50% sucrose and placed on a column of Sephadex G–75 (TM-crosslinked dextran) equilibrated with 0.2 M phosphate, pH 7.4 (void volume=136 ml.). Elution utilized 0.2 M phosphate buffer, pH 7.4.

Fractions were collected and those eluants at or near the void volume (21 ml., total) were dialyzed and then lyophilized to yield a total of 5.59 mg.

Bioassay was determined by observing the decrease in glucose blood plasma levels as a function of time in rabbits. One and one-half hours after intravenous injection there was observed a 50% original level in glucose, after four hours 60% of the original level in glucose, and after six and one-half hours a 75% original level in glucose. (Injection levels were based upon an assumed 1% nitrogen content of the soluble insulin–EMA product.)

Further, for preparation of cationic polymer-hormone products, polymers having such groups present in the molecule are employed.

Partial imides of a starting carboxyl or carboxylic acid anhydride containing polymer, e.g., EMA, are produced by:

(A) Heating a limiting amount of a secondary or tertiary aminolower-alkylamine with a water solution of the hydrolyzed or carboxyl-containing form of the polymer in vacuo at a temperature of about 140–150° C. until a constant weight has been reached and water is no longer given off. Such a reaction simultaneously results in formation of imide groups and reformation of anhydride groups. In this manner, imide-polymer products are formed which possess 5–95% imide linkages, the remaining carboxyl groups (i.e., 95–5%, respectively) being present in the polymer as anhydride groups, the exact proportions being dependent upon the relative amounts of starting amine and polymer.

(B) Alternatively a partial amine-polymer product may be converted to the partial imide-polymer product by heating a partial amide-polymer product in vacuo at 140–150° C. until water is no longer given off. Such an imide-polymer product likewise possesses comparable proportions of imide and anhydride groups depending upon the number of amide groups originally contained in the starting partial amide-polymer product.

Partial secondary and tertiary aminolower-alkylamides of the starting carboxyl or carboxylic acid anhydride-containing polymer, e.g., EMA, are obtained by contacting the polymer with a limiting amount of the selected amine in suspension in a solvent such as benzene or hexane, resulting in formation of a partial amide-anhydride derivative of the polymer, or a corresponding amide-carboxylate product thereof. The number of amide groups is dependent upon the quantity of the amine used as compared with the quantity of polymer employed. Such amide-polymer products possess 5–95% amide groups, with remaining carboxyl groups being present as anhydride groups.

Partial aminoester-polymer products are most conveniently prepared by heating at reflux temperatures overnight a limiting quantity of the selected aminoalcohol and carboxyl or carboxylic acid anhydride containing polymer, e.g., EMA, in a dry organic solvent such as toluene or dimethylformamide. The resulting product contains ester groups, carboxylic acid groups and anhydride groups, the respective numbers of which are determined by the quantity of aminoalcohol used in relation to the amount of polymer employed. Suitable blocking and unblocking of the amine moiety may be effected when required.

These products are reacted with the selected hormone according to the procedure of the foregoing examples to give the desired active cationic polymer-hormone product.

For nonionic polymer-hormone products, neutral groups may be attached to the polymer molecule after hormone attachment, e.g., alkylamines, aminoalcohols, and alcohols may be attached via reaction with residual carboxylic or carboxylic acid anhydride groups of the polymer in the usual fashion.

Thus, in the foregoing manner, the following additional water-soluble and insoluble products are prepared, the polymer in each case having cationic substituents: Hormone—dilower-alkylaminolower-alkanol esters of any of the polymers employed in the foregoing examples, hormone—lower-alkylaminolower-alkanol esters of any of the polymers employed in the foregoing examples, and hormone—aminolower-alkanol esters of any of the polymers employed in the foregoing examples; e.g., the BGH-dimethylaminopropanol ester of EMA, the ACTH-ethylaminobutanol ester of EMA, insulin-aminoethanol ester of polymaleic or polyacrylic anhydride or acid; hormore—dilower-alkylaminolower-alkylimides of any of the polymers employed in the foregoing examples, hormone—lower-alkylaminolower-alkylimides of any of the polymers employed in the foregoing examples, and hormone—aminolower-alkylimides of any of the polymers employed in the foregoing examples, e.g., the BGH-diethylamino-propylimide of EMA, the ACTH-methylaminobutylimide of EMA, and the insulin-aminopentylimide of polymaleic or polyacrylic anhydride or acid; hormone—dilower-alkylaminolower-alkylamides of any of the polymers employed in the foregoing examples, hormone—lower-alkylaminolower-alkylamides of any of the polymers employed in the foregoing examples, and hormone—aminolower-alkylamides of any of the polymers employed in the foregoing examples, e.g., the BGH-dimethylaminopropylamide of EMA, the ACTH-ethylaminohexylamide of EMA, and the insulin-aminopropylamide of polymaleic or polyacrylic anhydride or acid.

It is apparent from the foregoing that the preferred polymer-hormone products of the invention are those wherein the polymer is selected from the group consisting of (A) ethylene/maleic anhydride copolymer, styrene/maleic anhydride copolymer, vinyl methyl ether/maleic anhydride copolymer, vinylacetate/maleic anhydride copolymer, divinyl ether/maleic anhydride cyclopolymer, polymaleic anhydride, polyacrylic anhydride, and cationic derivatives thereof.

and wherein the hormone moiety comprises a hormone selected from the group consisting of (B) BGH, insulin, vasopressin, ACTH, glucagon, thyroxine, TSH, prolactin, LH, FSH, MSH, oxytocin, secretin, bradykinen, angiotensin, and lipotropic hormone.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims.

We claim:

1. A hormonally active reaction product of (A) a peptide hormone selected from the group consisting of bovine growth hormone, insulin, vasopressin and adrenocorticotropic hormone and (B) an about equimolar copolymer of ethylene and maleic anhydride having a molecular weight in the range of about 1,000 to about 1,000,000, wherein (A) is covalently bound to (B), produced by reacting (A) with (B) in an aqueous solution at a pH of about 5 to 9.5.

2. Product of claim 1, wherein the hormone is bovine growth hormone.

3. Product of claim 1, wherein the hormone is vasopressin.

4. Product of claim 1, wherein the hormone is insulin.

5. Product of claim 1, wherein the hormone is adrenocorticotropic hormone.

6. Product of claim 1, which is hormonally active water-soluble reaction product of ethylene/maleic anhydride copolymer and bovine growth hormone.

7. Product of claim 1, which is hormonally active water-soluble reaction product of ethylene/maleic anhydride copolymer and insulin.

8. Product of claim 1, which is hormonally active water-soluble reaction product of ethylene/maleic anhydride copolymer and vasopressin.

9. Product of claim 1, which is hormonally active water-soluble reaction product of ethylene/maleic anhydride copolymer and adrenocorticotropic hormone.

References Cited

UNITED STATES PATENTS

| | | | |
|---|---|---|---|
| 2,865,902 | 12/1958 | Blanchette | 260—93.5 |
| 3,121,043 | 2/1964 | Tobin et al. | 424—78 |
| 3,192,114 | 6/1965 | Hogberg et al. | 424—183 |
| 3,370,046 | 2/1968 | Wagner et al. | 260—78 |
| 3,502,545 | 3/1970 | Westman et al. | 195—66 |

FOREIGN PATENTS

| | | | |
|---|---|---|---|
| 6613752 | 3/1967 | Netherlands | 260—112.5 |

OTHER REFERENCES

Butler et al.: Biochem. J., 103, 78P–79P (1968).
Dellacha et al.: Experientia, 22, 16–17 (1966).
Levin et al.; Biochemistry (Wash.), 3, 1905–1913 (1964).
Santome et al.: Biochem. Appl., 14, 359–374 (1967).
Schroder et al.: The Peptides, vol. II, Academic Press, New York (1966), p. 378.

LEWIS GOTTS, Primary Examiner

M. KASSENOFF, Assistant Examiner

U.S. Cl. X.R.

260—8, 78 TF, 78.4 D, 78.5 T, 80.73, 80.76, 80.8, 86.1, 88.1 PC, 112 R, 112.7, 519; 424—78, 79, 81, 177, 178, 179